(12) United States Patent
Shioji et al.

(10) Patent No.: US 7,237,950 B2
(45) Date of Patent: Jul. 3, 2007

(54) OPTICAL FIBER TEMPERATURE SENSOR AND TEMPERATURE MEASURING METHOD

(75) Inventors: Tamaou Shioji, Hitachi (JP); Shigeo Uchiyama, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/190,865

(22) Filed: Jul. 28, 2005

(65) Prior Publication Data

US 2006/0133450 A1    Jun. 22, 2006

(30) Foreign Application Priority Data

Dec. 22, 2004 (JP) .............................. 2004-371442

(51) Int. Cl.
*G01D 11/32* (2006.01)

(52) U.S. Cl. ....................... 374/161; 374/137
(58) Field of Classification Search ................ 374/161, 374/137; 356/317
See application file for complete search history.

(56) References Cited

U.S. PATENT DOCUMENTS

| 4,151,747 A | * | 5/1979 | Gottlieb et al. ............. 374/161 |
| 5,035,511 A | * | 7/1991 | Berthold ..................... 374/124 |
| 6,511,222 B1 | * | 1/2003 | Bouamra ..................... 374/161 |
| 6,698,919 B2 | * | 3/2004 | Chi et al. ..................... 374/45 |

FOREIGN PATENT DOCUMENTS

| JP | 8-334420 | 12/1996 |
| JP | 9-210809 A | 8/1997 |
| JP | 2002-249335 A | 9/2002 |

\* cited by examiner

*Primary Examiner*—G. Bradley Bennett
(74) *Attorney, Agent, or Firm*—Foley & Lardner LLP (57) ABSTRACT

An optical fiber temperature sensor employs a holey fiber. The holey fiber has an optical fiber concentrated part that a predetermined length of the holey fiber is concentrated in a spot region that is included in a space to be measured in temperature distribution. The optical fiber concentrated part has a bend formed by looping or winding the holey fiber.

23 Claims, 7 Drawing Sheets

1: OPTICAL FIBER
1a: HOLEY FIBER
2: OPTICAL FIBER CONCENTRATED PART
41: SHEET
42: TEMPERATURE SENSOR SHEET

1: OPTICAL FIBER
1a: HOLEY FIBER
2: OPTICAL FIBER CONCENTRATED PART
41: SHEET
42: TEMPERATURE SENSOR SHEET

FIG. 6

1 : OPTICAL FIBER
1a: HOLEY FIBER
2 : OPTICAL FIBER CONCENTRATED PART
41: SHEET
42: TEMPERATURE SENSOR SHEET

1a: HOLEY FIBER
 2: OPTICAL FIBER CONCENTRATED PART
 3: OPTICAL FIBER THERMOMETER
111: SINGLE-MODE FIBER
112: OPTICAL FIBER CONNECTING BOX

OPTICAL FIBER TEMPERATURE SENSOR AND TEMPERATURE MEASURING METHOD

The present application is based on Japanese patent application No. 2004-371442, the entire contents of which are incorporated herein by reference.

BACKGROUND OF THE INVENTION

1. Field of the Invention

This invention relates to temperature measurement using an optical fiber and, particularly, to an optical fiber temperature sensor and a temperature measuring method.

2. Description of the Related Art

An optical fiber temperature sensor is known in which a temperature distribution along the longitudinal direction of an optical fiber is measured based on a change in transmitted light when light is inputted to an optical fiber. By placing such an optical fiber in a space such as a surface or inside of a temperature measuring object, a temperature distribution of the space can be measured. An optical fiber thermometer is also known which converts a change in transmitted light into a temperature distribution along the longitudinal direction. When the optical fiber (or optical fiber temperature sensor) is connected to the optical fiber thermometer, the temperature distribution can be measured in known method. Herein, the explanation of a principle for the temperature measurement is omitted.

However, there is a restriction as to distance resolution in the measurement results by the optical fiber thermometer. The measurement result of a point on an optical fiber is obtained as an average value of temperatures in a range of a predetermined length lying before and after the point. Namely, the length range corresponds to the distance resolution. It is impossible to measure in accurate resolution the difference of temperatures on multiple points in a region narrower than the distance resolution. Thus, the accuracy of optical fiber thermometer depends on a data sampling interval (i.e., interval in distance) in addition to the distance resolution.

Figure 1:
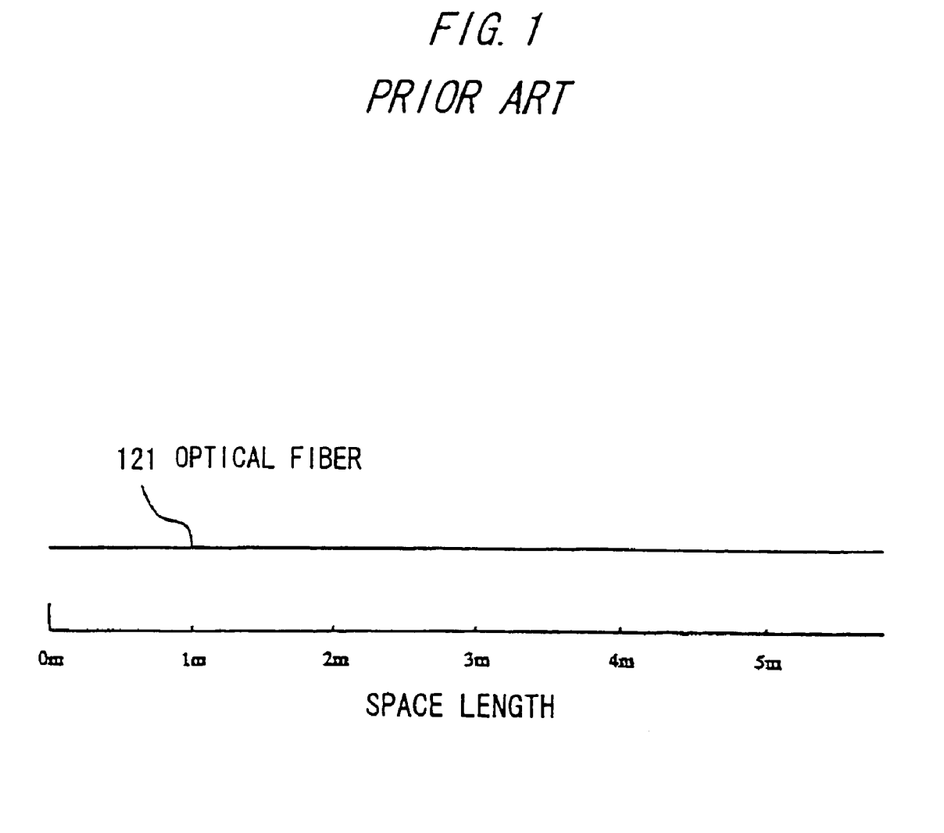
FIG. 1 is a plain view showing the conventional optical fiber temperature sensor.

FIG. 1 is a plain view showing a conventional optical fiber temperature sensor.

An optical fiber 121 is linearly placed in a space of 5 m in length. When the data sampling interval of the optical fiber thermometer is 1 m, a temperature at five points can be measured at intervals of 1 m.

JP-A-9-210809 discloses an example of an optical fiber temperature sensor.

JP-A-2002-249335 discloses an example of a holey fiber.

In order to measure a temperature (called spot temperature) in a spot region narrower than a distance resolution in a space where an optical fiber is placed by using the optical fiber with the distance resolution and an optical fiber thermometer, a method may be employed in which a predetermined length portion of an optical fiber which corresponds to the data sampling interval is concentrated in the spot region. In this case, since the predetermined length portion of the optical fiber falls within the spot region, the spot temperature can be accurately measured.

Thus, if an optical fiber concentrated part is formed to allow the predetermined length portion of the optical fiber to be concentrated in the narrow spot region, the optical fiber must have a bend. The narrower the spot region becomes, the greater the bend is (i.e., the bend radius becomes smaller). For example, when it is desired that a temperature distribution in the space as shown in FIG. 1 is measured at points as many as possible, the bend radius becomes smaller since the spot region becomes narrower as the number of the points increases.

However, in general, an optical fiber is subjected to optical transmission loss caused by the bend. As the bend radius decreases, the optical transmission loss generated at the bend portion increases. Further, when there are multiple bend portions on the entire length of an optical fiber, optical transmission losses at the respective bend portions are superposed to increase the entire length of the optical fiber. Thus, if the number of bend portions increases, the optical transmission loss increases in total.

As such, if the optical transmission loss is increased by reducing the bend radius or increasing the number of the bend portion, the temperature measurement of the optical fiber thermometer is disturbed.

For example, when a loop portion with a bend radius less than 100 mm is made, a large optical transmission loss is generated and therefore it is impossible to increase the number of the loop portion. Further, since the large optical transmission loss is generated at the loop portion, the entire length of the optical fiber needs to be reduced to suppress the total optical transmission loss. Further, due to the large optical transmission loss generated at the loop portion, temperature measurement will be disturbed and the accuracy of measurement will lower.

As such, even though it is desired to wholly and accurately measure the temperature distribution of a space, a small number of measurement points must be located in the space.

SUMMARY OF THE INVENTION

It is an object of the invention to provide an optical fiber temperature sensor that can be applied to a narrowed spot region to increase the number of measurement points.

It is a further object of the invention to provide a temperature measuring method that can accurately measure the temperature distribution of a measurement space by using the optical fiber temperature sensor.

According to one aspect of the invention, an optical fiber temperature sensor comprises:

a holey fiber, wherein the holey fiber comprises an optical fiber concentrated part that a predetermined length of the holey fiber is concentrated in a spot region that is included in a space to be measured in temperature distribution.

It is preferred that the optical fiber concentrated part comprises a bend formed by looping or winding the holey fiber.

It is preferred that the optical fiber concentrated part comprises the bend formed with a bend radius d to satisfy:

$$d \geq \Delta L \times x / (2\pi(L-L0))$$

where x is an entire length of the holey fiber, $\Delta L$ is an optical transmission loss per one loop or winding, $L0$ is an optical transmission loss in case of no bend in the holey fiber, and $L$ is a maximum acceptable optical transmission loss.

The optical fiber temperature sensor may further comprise a sheet on which the optical fiber concentrated part is formed.

According to another aspect of the invention, a temperature measuring method comprises the steps of:

placing an optical fiber near to a spot region of a temperature measuring object; and measuring a temperature at the spot region based on a change in transmitted light when light is inputted into the optical fiber, wherein the optical fiber comprises a holey fiber, and the holey fiber comprises an optical fiber concentrated part that a predetermined length of the holey fiber is concentrated in the spot region.

BRIEF DESCRIPTION OF THE DRAWINGS

The preferred embodiments according to the invention will be explained below referring to the drawings, wherein:

FIG. 4 is side view showing an optical fiber concentrated part in a preferred embodiment of the invention;

DETAILED DESCRIPTION OF THE PREFERRED EMBODIMENTS

Figure 2:
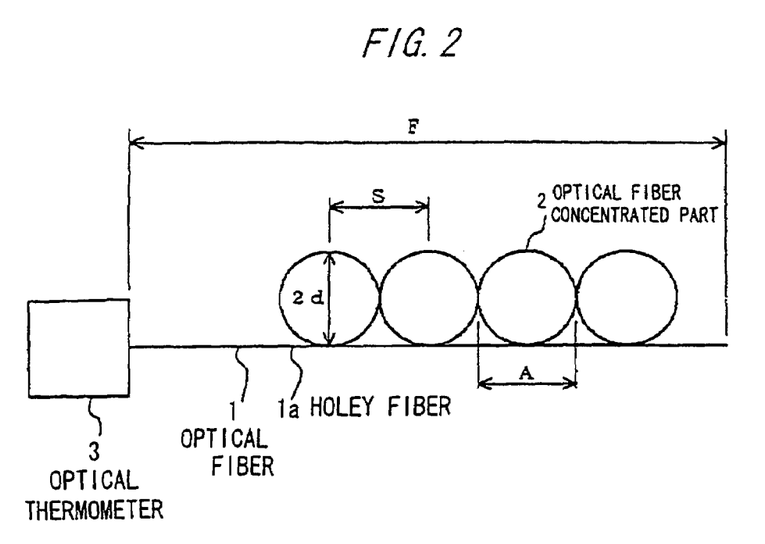
FIG. 2 is a constructional diagram showing an optical fiber temperature sensor in a preferred embodiment of the invention.

FIG. 2 is a constructional diagram showing an optical fiber temperature sensor in a preferred embodiment of the invention.

As shown in FIG. 2, the optical fiber temperature sensor of the invention employs an optical fiber 1 that allows the measurement of temperature distribution along the longitudinal direction of the optical fiber 1 based on a change in transmitted light to be inputted to the optical fiber 1. A predetermined length portion of the optical fiber 1 is concentrated at an optical fiber concentrated part 2 which is located in a relatively narrow spot region A of a space (i.e., all regions in FIG. 2) where the optical fiber 1 is placed. A holey fiber 1a is used as the optical fiber 1. Thus, the optical fiber temperature sensor is composed to measure the spot temperature in the spot region A.

The internal structure, mechanical property and optical property of the holey fiber 1a are known. For example, they are disclosed in JP-A-2002-249335, entire contents of which are incorporated herein by reference.

As shown in FIG. 2, one end of the holey fiber 1a is connected to an optical fiber thermometer 3. The opposite end of the holey fiber 1a is opened or terminated. The holey fiber 1a with a whole length x is placed in a space length F from the one end to the opposite end of the holey fiber 1a.

Figure 5:
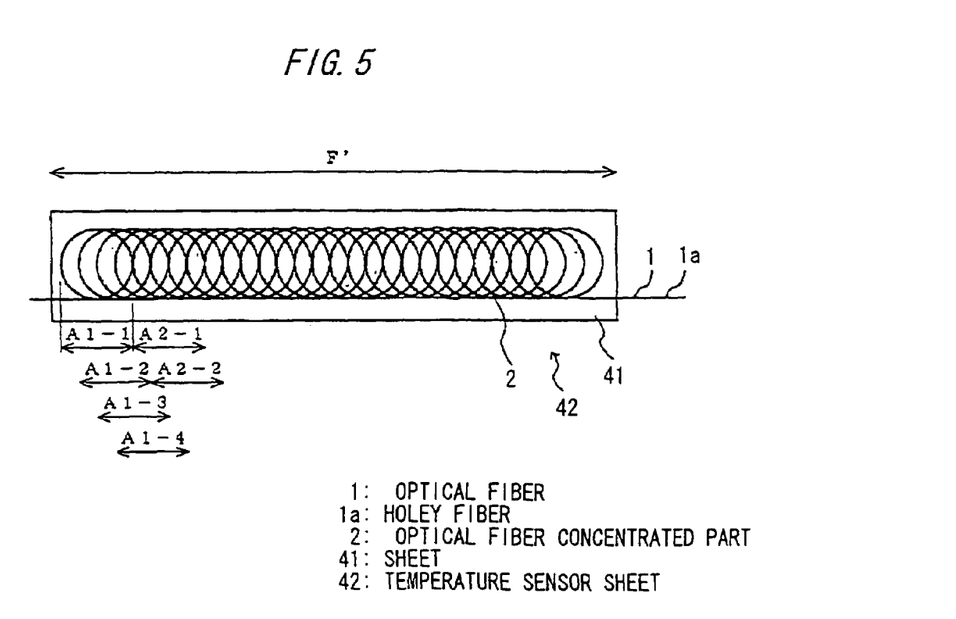
FIG. 5 is a plain view showing a temperature sensor sheet with an optical fiber concentrated part in a preferred embodiment of the invention.

The optical fiber concentrated part 2 is formed by looping or winding the predetermined length portion of the holey fiber 1a. In FIG. 2, the four optical fiber concentrated parts 2 are formed separately at intervals of a pitch S. Another example to continuously form the optical fiber concentrated part 2 is shown in FIG. 5, which is explained later.

The optical fiber concentrated part 2 is formed of a loop by winding the holey fiber 1a. Although the number of winds may be any number, one loop is made at each of the optical fiber concentrated parts 2 in this embodiment.

Although the loop needs not to be a perfect circle, in this embodiment, the loop of the optical fiber concentrated part 2 is made to be a circle with a radius of d such that it has the minimum bend radius of d and the holey fiber 1a is placed concentrated in a region as narrow as possible.

In this embodiment, the pitch S is set to be S=2d such that the adjacent optical fiber concentrated parts 2 are in contact with each other. However, the adjacent optical fiber concentrated parts 2 may be separated from each other.

In the above configuration, the entire length x of the optical fiber 1 is represented as $x = F+4 \times 2\pi d$ since it is obtained by adding the respective loop lengths, $4 \times 2\pi d$, to the linear distance F of the space. If the loops are wound while being shifted as shown in FIG. 5 without connecting the adjacent loops with a line as shown in FIG. 2, the entire length x of the optical fiber 1 can be approximated as $x = F + 2\pi d \times T$, where T is the number of winds.

The bend radius d of the optical fiber concentrated part 2 is set to be a value to satisfy:

$$d \geq \Delta L \times (x-F)/(2\pi(L-L0)) \qquad (2)$$

where x is the entire length of the optical fiber 1, F is the linear distance of the space, $\Delta L$ is an optical transmission loss per one loop, L0 is an optical transmission loss in case of no bend, L is a maximum acceptable optical transmission loss to satisfy the accuracy in temperature measurement, and $\pi$ is the circular constant.

In explaining the derivation of the above expression (2) taking into account an example as shown in FIG. 5, since the optical fiber 1 is continuously looped over the entire length F of the space, $$x = F2\pi d \times T \qquad (3)$$

gives the entire length x of the optical fiber 1, where T is the number of winds.

Then, provided that the maximum acceptable optical transmission loss L required is L, an optical transmission loss per one loop is $\Delta L$, and the number of winds is T, $$L \geq L0 + \Delta L \times T \qquad (4)$$

is to be satisfied.

Substituting T into the expression (4) by modifying the expression (3), $$L - L0 \geq \Delta L \times (x-F)/2\pi d \qquad (5)$$

Since $L - L0 \geq 0$ is given from the definition, $$d \geq \Delta L \times (x-F)/(2\pi(L-L0)) \qquad (2)$$

is obtained.

In order to allow the optical transmission loss of the entire length of the optical fiber 1 to be within the maximum acceptable optical transmission loss L, the bend radius d can be obtained by using the entire length x of the optical fiber 1, the maximum acceptable optical transmission loss L, the optical transmission loss ΔL per one loop, and the optical transmission loss L0 in case of no bend.

Figure 11:
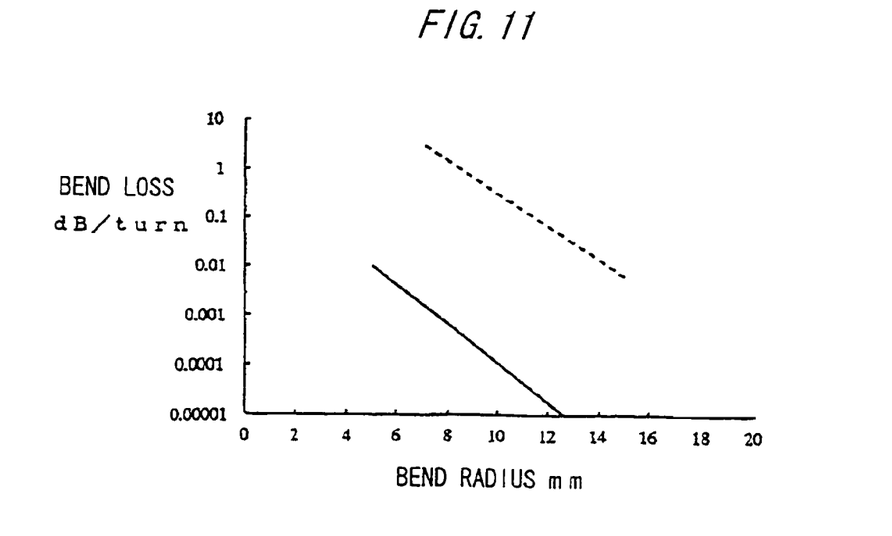
FIG. 11 is a characteristic diagram showing optical transmission loss in a holey fiber and a single-mode fiber, where the relationship between a bend radius and a bend loss per one loop is shown.

FIG. 11 is a characteristic diagram showing optical transmission loss in a holey fiber and a single-mode fiber, where the relationship between a bend radius and a bend loss per one loop is shown.

In FIG. 11, the full lines show the relationship between the bend radius d and the optical transmission loss ΔL in a typical holey fiber. As shown, the optical transmission loss ΔL decreases as the bend radius d increases, and the optical transmission loss ΔL increases as the bend radius d decreases.

The dotted lines show the relationship between the bend radius and the optical transmission loss ΔL in a typical single-mode fiber. As shown, it will be appreciated that even with a relatively large bend radius, the optical transmission loss ΔL is large, and the optical transmission loss ΔL becomes significantly large as the bend radius d decreases.

A comparative example and an example of the invention are compared to know how long the entire length x of the optical fiber can be secured. In the comparative example, provided that the maximum acceptable optical transmission loss L required by the optical fiber thermometer 3 is 10 dB, when a single-mode fiber is wounded with a bend radius of 10 cm, the number T of loops cannot be more than 11 since the optical transmission loss ΔL per one loop is 0.9 dB/loop. As a result, the entire length x of the optical fiber has no more than 1 m. Therefore, it is not practical.

In the example of the invention, the number T of loops can be as many as 100,000 since the optical transmission loss ΔL per one loop is 0.0001 dB/loop. As a result, the entire length x of the optical fiber can have 9420 m.

As described above, since the invention employs the holey fiber 1a as the optical fiber 1, optical signal that has intensity sufficient to allow the accurate temperature measurement at the optical fiber thermometer 3 can be obtained even when the bend radius d decreases. Further, the spot region can be narrower since the bend radius d can be reduced. Further, since the increase of optical transmission loss caused by the bend is relatively small, the number of measurement points can be increased and the entire length of the optical fiber 1 can be also increased. Further, in the invention, even when the size of a temperature measuring object is smaller than the conventional spot region, the spot region can be applied to such a size of the temperature measuring object.

Figure 3:
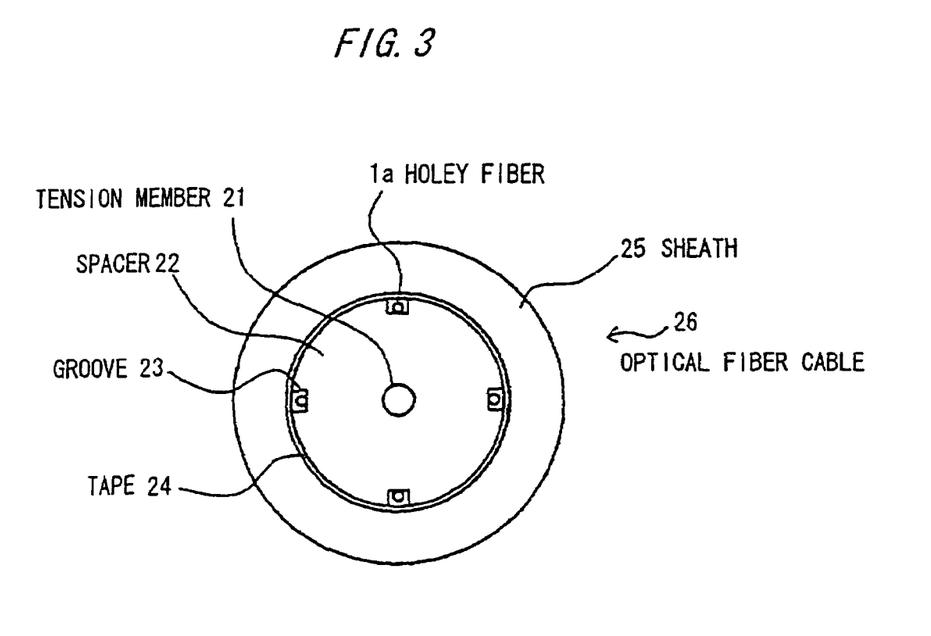
FIG. 3 is a cross sectional view showing an optical fiber cable to be used as a modification of an optical fiber in the invention.

FIG. 3 is a cross sectional view showing an optical fiber cable to be used as a modification of the optical fiber in the invention.

The optical fiber 1 as shown in FIG. 2 needs not to be a simple body of the holey fiber 1a. For example, as shown in FIG. 3, it may be the optical fiber cable 26 that a spacer 22 with a groove 23 on the periphery is formed around a tension member 21, the holey fiber 1a is placed in the groove 23, and the spacer 22 is covered by winding a tape 24 and a sheath 25 is formed thereon. Thus, by using the optical fiber cable 26 as the optical fiber 1, the holey fiber 1a can be protected from being broken or deformed even if an object in the space hits the optical fiber cable 26.

FIG. 4 is side view showing an optical fiber concentrated part in the preferred embodiment of the invention.

As shown in FIG. 4, the optical fiber concentrated part 2 may be formed by winding the holey fiber 1a around a columnar or cylindrical core material 31 such as a cable and a pipe. The way of winding the holey fiber 1a around the columnar or cylindrical core material 31 is easy in manufacture as compared to a case that it is wound with no core material. Also, it is easy to separately or continuously form the optical fiber concentrated part 2 in the longitudinal direction of the core material 31. Herein, the composition of the holey fiber 1a and the core material 31 wound around there is called a cable-shaped sensor 32.

Figure 6:
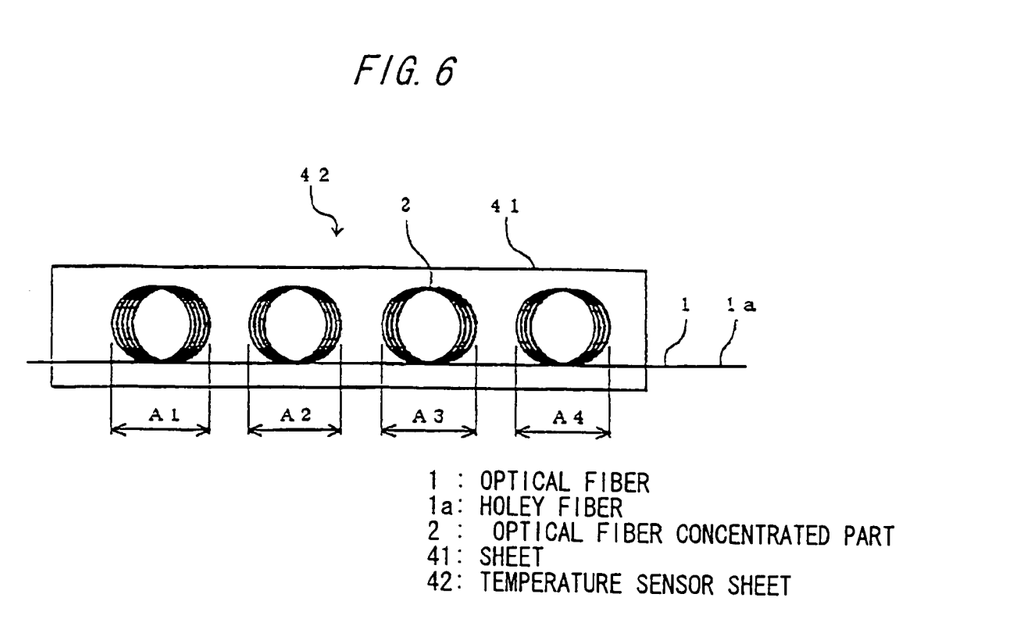
FIG. 6 is a plain view showing a temperature sensor sheet with an optical fiber concentrated part in a preferred embodiment of the invention.

FIGS. 5 and 6 are plain views showing temperature sensor sheets with an optical fiber concentrated part in the preferred embodiment of the invention.

As shown in FIGS. 5 and 6, the temperature sensor sheet 42 may be constructed by forming the optical fiber concentrated part 2 on a sheet 41 with a predetermined length. The holey fiber 1a can be secured on the sheet 41 by using adhesives such as jelly, silicone, or by a method of laminating or wiring.

Alternatively, the holey fiber 1a may be placed in a sheet-like case called a sheet case. By thus configuring the temperature sensor sheet 42, the entire thickness can be reduced. Therefore, the temperature sensor sheet 42 becomes easy to install at the surface or inside of a temperature measuring object. Especially, when it is installed at the surface of the temperature measuring object, heat propagation from the temperature measuring object can be enhanced.

Alternatively, when the sheet 41 is made of a material with a high flexibility, it can be in close contact with the temperature measuring object even when the temperature measuring object is curved in outer shape. Also, it can easily form the optical fiber concentrated part 2 separately or continuously in the longitudinal direction of the sheet 41. Further, since the temperature sensor sheet 42 has a width equal to the spot region A in the width direction of the sheet 41, for the temperature measuring object with a flat plane, the flat plane can be closely covered with the temperature sensor sheet 42. Thereby, temperature distribution at the entire flat plane can be measured.

The difference between the two embodiments in FIGS. 5 and 6 is that the optical fiber concentrated part 2 in FIG. 6 is separately formed while the optical fiber concentrated part 2 in FIG. 5 is continuously formed. In FIG. 6, each of the multiple optical fiber concentrated parts 2 includes the holey fiber 1a with multiple loops (though it may be one loop) wound substantially in concentric form on the plane. Thus, since the multiple optical fiber concentrated parts 2 are formed at intervals, spot regions A1, A2, A3 and A4 can be provided at intervals.

In FIG. 5, the holey fiber 1a is formed winding a first loop on the plane, the next loop being wound while shifting the loop center by a small pitch, the next loop being wound while shifting the loop center in like manner, such that the loops are formed shifted in one direction. Although the holey fiber 1a of the embodiment in FIG. 4 is formed spiral, it also allows the continuous formation of the optical fiber concentrated parts 2.

By thus forming the continuous optical fiber concentrated parts 2, a number of spot regions A1-1, A1-2, A1-3, . . . , A2-1, A2-2, A2-3, . . . can be obtained infinitely as shown in FIG. 5. Although resolution is not so excellent since adjacent spot regions A1-1 and A1-2 are overlapped, spot regions A1-1 and A2-2 are perfectly separated without being overlapped. Thus, separate spot regions can be secured as many as possible in a length F' (i.e., the length of the temperature sensor sheet 42) of the continuous optical fiber concentrated parts 2. Further, after disposing the temperature sensor sheet 42 in the measurement space, the distance (i.e., the distance from the end of the optical fiber to the center of the optical fiber loop being located within the spot region) of the measurement point can be desirably controlled by the optical fiber thermometer 3.

Figure 7:
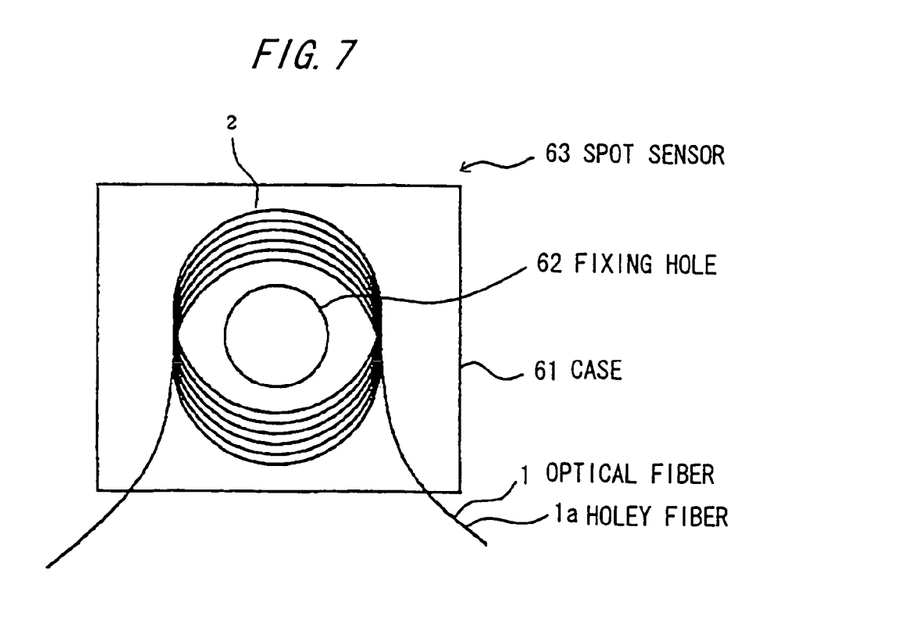
FIG. 7 is a plain view showing a spot sensor with an optical fiber concentrated part in a preferred embodiment of the invention.

FIG. 7 is a plain view showing a spot sensor with an optical fiber concentrated part in the preferred embodiment of the invention.

As shown, the optical fiber concentrated part 2 is placed in a case 61, which is provided with a fixing hole 62 to penetrate through the case 61. By using the fixing hole 62, the case 61 can be attached onto the surface of a temperature measuring object or onto a wall or a support in the measurement space. The embodiment thus constructed is herein called a spot sensor 63. By suitably disposing the spot sensor 63 midway on the optical fiber 1, temperature at that point can be measured accurately.

Figure 8:
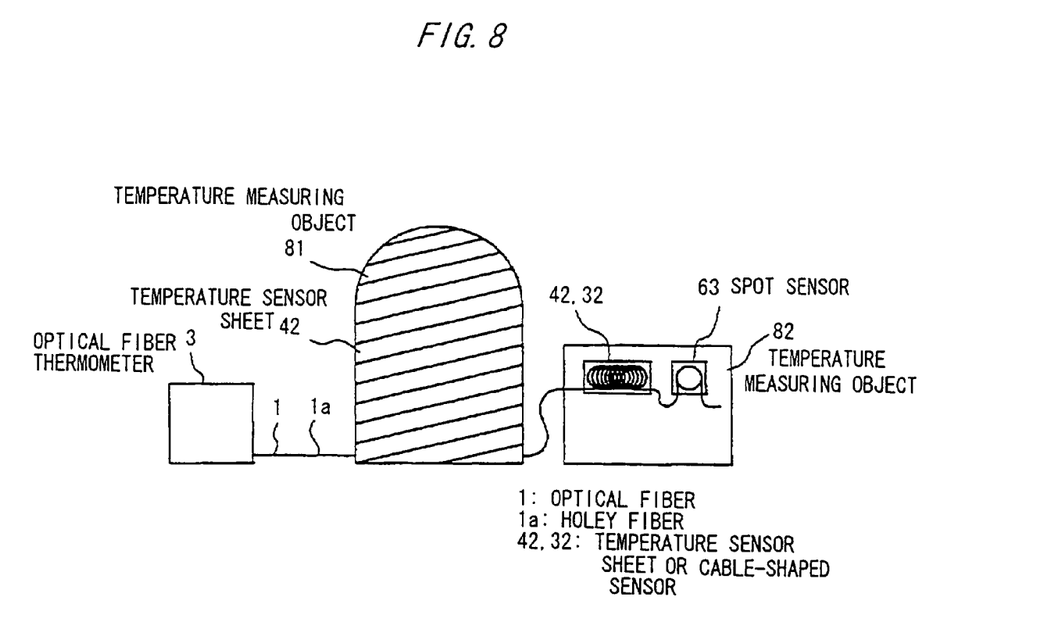
FIG. 8 is an illustrative diagram showing an optical fiber temperature sensor of the invention to be installed on a real measurement site.

FIG. 8 is an illustrative diagram showing an optical fiber temperature sensor of the invention to be installed on a real measurement site. In FIG. 8, two different temperature measuring objects 81, 82 (both of which have a structural body) can be subjected to temperature measurement by one optical fiber 1 (i.e., the holey fiber 1a) extending from the optical fiber thermometer 3. The temperature measuring object 81 is formed columnar at its base portion and dome-shaped at its top portion. In order to measure the surface temperature distribution of the temperature measuring object 81 at intervals of a small distance, the temperature sensor sheet 42 as shown in FIG. 5 or 6 is wound around the temperature measuring object 81 to cover the entire surface. The temperature measuring object 82 is provided with the temperature sensor sheet 42 or cable-shaped sensor 32 as shown in FIG. 4 and the spot sensor 63 as shown in FIG. 7, which are inserted into or embedded in the temperature measuring object 82.

As seen from the embodiment in FIG. 8, the temperature sensor sheet 42 with a small thickness and a good flexibility can be advantageously used to measure the surface temperature of a structural body with a curved surface like the temperature measuring object 81. In the invention, since temperature distribution can be measured at a sampling interval shorter than the data sampling interval of the optical fiber thermometer 3, different temperatures can be accurately measured at the surface of the temperature measuring object 81.

Further, the spot sensor 63. can be advantageously used to accurately measure a temperature at a local point.

The comparison of the invention and the conventional technique will be explained below.

Figure 9:
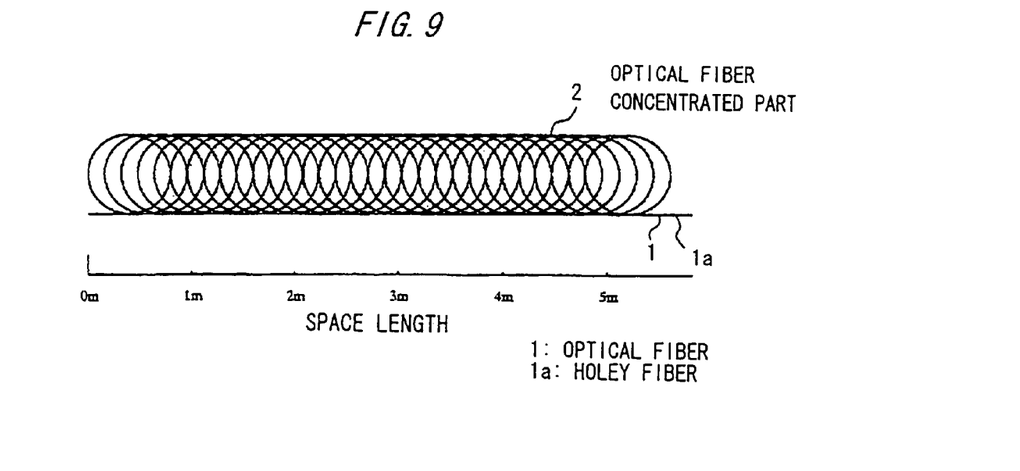
FIG. 9 is a plain view showing a continuous optical fiber concentrated part of the invention to be placed in a space.

FIG. 9 is a plain view showing a continuous optical fiber concentrated part of the invention to be placed in a space.

As shown in FIG. 9, the optical fiber 1 as the continuous optical fiber concentrated part 2 is provided in a 5 m long space. For example, 5 m of the long optical fiber 1 is wound per 1 m of the space. If the data sampling interval of the optical fiber thermometer 3 is 1 m, temperature can be measured at five points per 1 m of the space, i.e., at 25 points for the entire space. Thus, a distance resolution of 20 cm in space length can be obtained.

Figure 10:
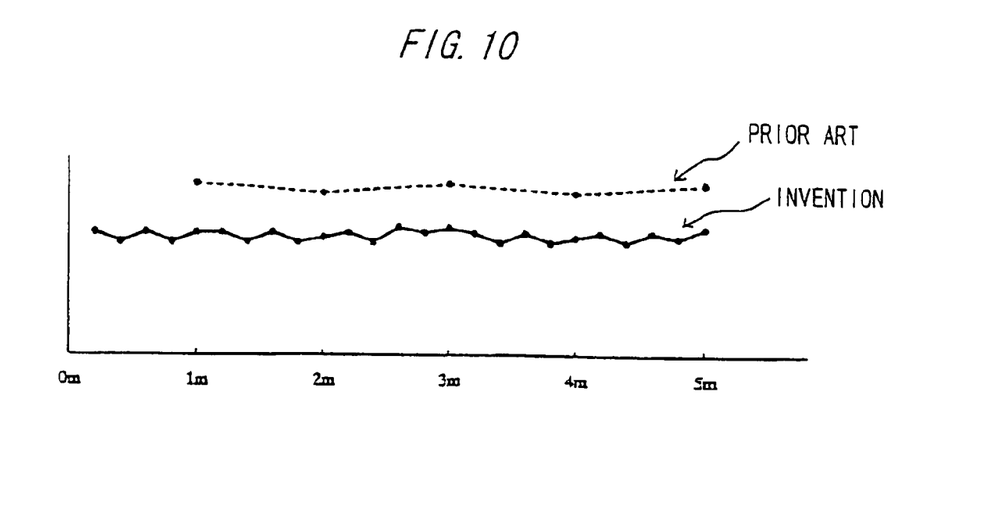
FIG. 10 is a graph showing a temperature distribution for the comparison between the invention and prior art.

FIG. 10 is a graph showing a temperature distribution for the comparison between the invention and prior art.

In comparing the invention with the conventional optical fiber temperature sensor (prior art example) as shown in FIG. 1, the measurement data of temperature distribution obtained from both examples are shown together in FIG. 10. However, in order to facilitate the visual comparison, the measurement data of the invention example are plotted somewhat lower than the real data.

As shown in FIG. 10, in prior art, temperature at 5 points only can be measured at intervals of 1 m since the data sampling interval of the optical fiber thermometer 3 is 1 m. In contrast, in the invention, temperature at 25 points can be measured since the distance resolution of 20 cm in space length is obtained due to the winding of the 25 m long optical fiber 1 as shown in FIG. 9 even when the data sampling interval of the optical fiber thermometer 3 is 1 m. Thus, the data (depicted in full lines) of the invention can reflect a slight fluctuation in temperature, while the data (depicted in dotted lines) of prior art, which are obtained by linear interpolation between measurement points, cannot reflected such a fluctuation in temperature.

The invention can be altered variously other than the above embodiments.

For example, the holey fiber 1a may be made of glass or plastics. Instead of the holey fiber 1a, a low-loss optical fiber with a property similar to the holey fiber 1a may be used. The low-loss optical fiber is defined in that it has an optical transmission loss of 0.01 dB/loop or less at a bend radius of d=10 mm, and an optical transmission loss $\Delta L$ per one loop at a band radius d to satisfy:

$$\Delta L < 4774 \times d^{-5.68} \tag{6}$$

where $d \leq 50$ mm is given.

Figure 12:
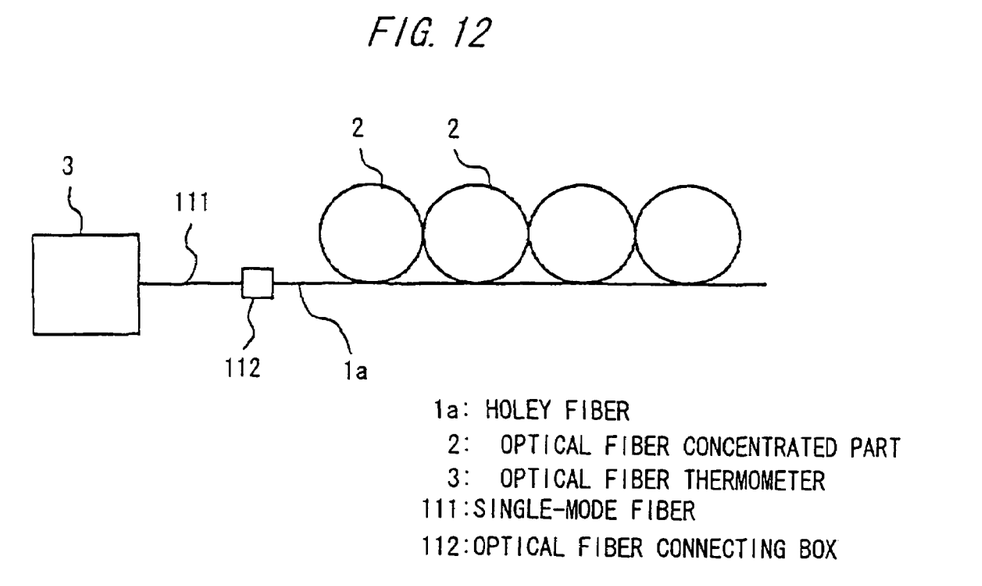
FIG. 12 is a constructional diagram showing an optical fiber temperature sensor in a preferred embodiment of the invention.

FIG. 12 is a constructional diagram showing an optical fiber temperature sensor in the preferred embodiment of the invention.

As shown in FIG. 12, a single-mode fiber 111 is connected to the optical fiber thermometer 3, and the holey fiber 1a is connected through an optical fiber connecting box 112 to the single-mode fiber 111. Since the holey fiber 1a is used for the optical fiber concentrated part 2 where the bend radius needs to be reduced, the same effects as the above embodiments can be obtained. In addition, the single-mode fiber 111 connected to the optical fiber thermometer 3 is used only for optical signal transmission and needs not be bent. Therefore, it does not cause an increase in optical transmission loss.

The optical fiber thermometer 3 is frequently provided with a reference optical fiber inside or outside thereof so as to determine a relative temperature in addition to the optical fiber 1 installed in the space, temperature measuring object. The optical fiber temperature sensor of the invention can be also used as the reference optical fiber.

<Advantages of the Invention>

The invention can be used for the measurement of temperature distribution in planar body or space other than the structural body and stereoscopic space. Also, it can be used for the monitoring of temporal change in temperature distribution by measuring the temperature distribution continuously or at intervals of a given time.

The optical fiber temperature sensor of the invention can be applied to a temperature measuring object with a small diameter and a large length such as a power cable with a small diameter or an electrical wire with a regular diameter so as to monitor its temperature.

The optical fiber temperature sensor of the invention can be applied to the surface or inside of a pipeline in the axis or radial direction thereof.

The optical fiber temperature sensor of the invention can be applied to a spherical temperature measuring object.

The invention can be applied to the field of strain measurement or vibration measurement with an enhanced distance resolution while converting a change in transmitted light of the optical fiber into a strain or vibration distribution along the longitudinal direction.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical fiber temperature sensor comprising:
   a holey fiber including an optical fiber concentrated part with a predetermined length;
   wherein the optical fiber concentrated part is concentrated in a spot region in a temperature distribution measuring space, and the optical fiber concentrated part comprises a bend formed with a bend radius d to satisfy:

$d \geq \Delta L \times (x-F)/(2\pi(L-L0))$ where x is an entire length of the holey fiber, ΔL is an optical transmission loss per one loop or winding, L0 is an optical transmission loss in case of no bend in the holey fiber, L is a maximum acceptable optical transmission loss, and F is a linear distance of the measuring space.

2. A temperature measuring method, comprising the steps of:
   placing an optical fiber near a spot region of a temperature measuring object; and
   measuring a temperature at the spot region based on a change in transmitted light when light is inputted into the optical fiber,
   wherein the optical fiber comprises a holey fiber, and the holey fiber comprises an optical fiber concentrated part with a predetermined length that is concentrated in the spot region.

3. The method according to claim 2, wherein:
   the optical fiber concentrated part comprises a bend formed by looping or winding the holey fiber.

4. The method according to claim 2, further comprising:
   forming the optical fiber concentrated part on a sheet.

5. A temperature measuring method comprising the steps of:
   placing an optical fiber near a spot region of a temperature measuring object; and
   measuring a temperature at the spot region based on a change in transmitted light when light is inputted into the optical fiber,
   wherein the optical fiber comprises a holey fiber, and the holey fiber comprises an optical fiber concentrated part with a predetermined length that is concentrated in the spot region, and
   wherein the optical fiber concentrated part comprises a bend formed with a bend radius d to satisfy:

$d \geq \Delta L \times (x-F)/(2\pi(L-L0))$ where x is an entire length of the holey fiber, ΔL is an optical transmission loss per one loop or winding, L0 is an optical transmission loss in case of no bend in the holey fiber, L is a maximum acceptable optical transmission loss, and F is a linear distance of the measuring space.

6. An optical fiber temperature sensor, comprising:
   a holey fiber including an optical fiber concentrated part with a predetermined length,
   wherein the optical fiber concentrated part is concentrated in a spot region in a temperature distribution measuring space.

7. The optical fiber temperature sensor according to claim 6, wherein:
   the optical fiber concentrated part comprises a bend formed by looping or winding the holey fiber.

8. The optical fiber temperature sensor according to claim 6, further comprising:
   a sheet on which the optical fiber concentrated part is formed.

9. The optical fiber temperature sensor according to claim 6, further comprising:
   a spacer; and
   a groove formed on a periphery of the spacer for placing the holey fiber.

10. The optical fiber temperature sensor according to claim 9, further comprising:
    a tension member around which the spacer is formed;
    a tape for covering the spacer; and
    a sheath for covering the tape.

11. The optical fiber temperature sensor according to claim 6, further comprising:
    a core material around which the optical fiber concentrated part is wound.

12. The optical fiber temperature sensor according to claim 11, wherein:
    the optical fiber concentrated part is wound separately in a longitudinal direction of the core material.

13. The optical fiber temperature sensor according to claim 11, wherein:
    the optical fiber concentrated part is wound continuously in a longitudinal direction of the core material.

14. The optical fiber temperature sensor according to claim 8, wherein:
    the sheet is made of a material with a high flexibility.

15. The optical fiber temperature sensor according to claim 8, wherein:
    the sheet has a width equal to the spot region in a width direction of the sheet.

16. The optical fiber temperature sensor according to claim 8, wherein:
    the holey fiber is secured on the sheet by using an adhesive.

17. The optical fiber temperature sensor according to claim 8, wherein:
    the optical fiber concentrated part is formed separately.

18. The optical fiber temperature sensor according to claim 8, wherein:
    the optical fiber concentrated part is formed continuously.

19. The optical fiber temperature sensor according to claim 8, wherein:
    the sheet is connected to an optical fiber thermometer and another optical fiber temperature sensor.

20. The optical fiber temperature sensor according to claim 6, further comprising:
    a case in which the holey fiber is placed.

21. The optical fiber temperature sensor according to claim 20, further comprising:
    a fixing hole which penetrates through the case.

22. The optical fiber temperature sensor according to claim 6, wherein:

the optical fiber concentrated part is two or more optical fiber concentrated parts, and each optical fiber concentrated part is formed at a predetermined interval.

23. The optical fiber temperature sensor according to claim 6, wherein:

a loop of the holey fiber is shifted from a former loop with a predetermined pitch.

* * * * *